US006490801B1

(12) United States Patent
Hersom et al.

(10) Patent No.: US 6,490,801 B1
(45) Date of Patent: Dec. 10, 2002

(54) SUN SENSORS USING MULTI-PINHOLE OVERLAYS

(75) Inventors: Charles H. Hersom, Toronto (CA); Philip Duggan, Nepean (CA); William A. Gault, Toronto (CA)

(73) Assignee: Centre for Research in Earth and Space Technology, North York (CA)

( * ) Notice: Subject to any disclaimer, the term of this patent is extended or adjusted under 35 U.S.C. 154(b) by 0 days.

(21) Appl. No.: 09/714,797

(22) Filed: Nov. 17, 2000

Related U.S. Application Data (60) Provisional application No. 60/166,311, filed on Nov. 19, 1999.

(51) Int. Cl.[7] .......................... G01C 17/34; G01C 21/02
(52) U.S. Cl. .................... 33/268; 250/206.2; 33/DIG. 3
(58) Field of Search ..................... 33/268–271, DIG. 3; 250/203.1, 203.3, 203.4, 206.1, 206.2

(56) References Cited

U.S. PATENT DOCUMENTS

| | | | | |
|---|---|---|---|---|
| 3,937,981 A | * | 2/1976 | Kridler | 250/209 |
| 4,387,999 A | * | 6/1983 | Shelley | 33/268 |
| 4,491,727 A | | 1/1985 | Appelbaum et al. | |
| 4,656,748 A | * | 4/1987 | Thual | 33/270 |
| 5,276,496 A | * | 1/1994 | Heller et al. | 250/203.3 |
| 5,428,215 A | | 6/1995 | Dubois et al. | |
| 5,455,415 A | | 10/1995 | Yamada et al. | |
| 5,572,316 A | | 11/1996 | Zaffanella et al. | |
| 5,670,774 A | * | 9/1997 | Hill | 250/203.4 |
| 5,705,804 A | * | 1/1998 | Ramer et al. | 250/206.1 |
| 5,757,478 A | | 5/1998 | Ma | |
| 5,844,232 A | * | 12/1998 | Pezant | 250/203.2 |
| 5,886,351 A | * | 3/1999 | Ramer et al. | 250/225 |
| 5,914,483 A | * | 6/1999 | Fallon et al. | 250/203.4 |
| 6,084,228 A | * | 7/2000 | Hill et al. | 250/203.4 |

FOREIGN PATENT DOCUMENTS

| | | |
|---|---|---|
| EP | 0747719 | 11/1996 |
| GB | 2266634 | 3/1993 |
| JP | 01196509 | 8/1989 |
| WO | 9913359 | 3/1999 |

* cited by examiner

*Primary Examiner*—Diego Gutierrez
*Assistant Examiner*—Mirellys Jagan
(74) *Attorney, Agent, or Firm*—Nancy E. Hill; Hill & Schumacher (57) ABSTRACT

Sun sensors or position sensors may be used to determine the angular location of the sun or other object with respect to the sensor. The sun sensor provides high resolution over a wide field of regard. A position or sun sensor comprises a sensor housing, a plurality of pinholes formed In the sensor housing, a detector mounted within the housing and a method of processing the information detected. The detector is mounted in the sensor housing. Each pinhole has a field of view and the detector receives the images from each field of view. Each field of view is defined by the position of the pinhole relative to the detector. The images are received in an overlay relationship thereby providing a field of regard. The processing method determines the presence and location of an object In a field of regard.

35 Claims, 7 Drawing Sheets

I+II+III+IV

SUN SENSORS USING MULTI-PINHOLE OVERLAYS

CROSS REFERENCE TO RELATED PATENT APPLICATION

This patent application relates to U.S. Provisional Patent Application Ser. No. 60/166,311 filed on Nov. 19, 1999 entitled SUN SENSORS USING MULTI-PINHOLE OVERLAYS.

FIELD OF THE INVENTION

The present invention relates to sun sensors and in particular to sun sensors that provide the angular location of the sun with respect to the sensor reference frame.

BACKGROUND OF THE INVENTION

Sun sensors are required equipment for most satellites since they provide line-of-sight direction of the sun with respect to the satellite. Such sensors are useful during several stages of the satellite mission including transfer orbit; pre- and post-apogee motor firing; attitude acquisition; momentum dump attitude sensing; loss of attitude lock and re-acquisition; and other emergency and routine requirements. Sun sensors of various types are also used for solar array tracking, thermal control and sun presence detectors for star sensors and earth sensors. Sun sensors are also useful for ground-based equipment that require the location of the sun to be known.

The sun Is a very bright source emitting throughout the visible and infrared regions corresponding to a black body with a temperature of about 5900 K This means that it has a peak in its spectral radiance at about 500 nm in the middle of the visible band. Thus most instruments that view the sun use the visible region. Inevitably, much of the solar power falling onto such an instrument must be discarded to avoid overloading or overheating the detectors and other portions of the instrument optics. However, the sun is so intense that stray light issues can arise that remain significant even if rejection is high.

Given that the satellite is in orbit around the Earth, the location of the sun changes continually with respect to the satellite body axes. For equatorial orbits, the sun is constrained in elevation by the ecliptics. However, for other orbits this is not the case and a broader field-of-view, FOV, is required to continually monitor the sun's location. For the example case of a geosynchronous telecoms satellite and considering an Earth-centred set of coordinate axes, the operational range of the sun will be ±23.5 degrees in elevation from the orbit plane. During the day, the sun will appear to move through approximately 360 degrees in the azimuth plane. Normal and emergency operations as indicated above will require occasional access to a broader elevation range.

The accuracy required for a sun sensor is governed by its use in the attitude control strategy of the satellite mission. For the telecommunication satellite missions, the accuracy requirement is usually derived from antenna pointing specifications which are in turn driven by gain slopes attainable for the various radio frequency beams. As technology advances and tighter beams are utilized for point-to-point communications, the gain slopes are increasing requiring tighter tolerances on attitude control. Thus attitude resolution of an arc-minute or less is desirable and in certain instances may be necessary.

The combined problems of wide angular FOV and high resolution represent the major challenge to sensor designers. Most instruments must compromise between these two contradictory requirements. Having a FOV of 120×120 degrees with a resolution of 0.02 degree implies 6000 resolution elements in each direction. Thus multiple sensors are often used to provide a wide field-of-regard, FOR, (multiple FOV's) while maintaining the necessary resolution.

The sun subtends an angular size of 0.53 degree. For most instruments the sun can be considered a point source. As higher resolutions (such as 0.02 degree) are demanded this assumption must be re-examined and its implications considered, Manufacturers of digital sun sensors have relied on analog technology for the sensing elements but superimpose elaborate masks to provide the necessary resolution, Thus the sun at a given angle illuminates certain sensing photocells through a main slit and a mask consisting of reticle slits. The digital signal is usually produced as Gray code information based on which photocells produce voltages above a threshold level. This technique is only effective in a single axis so that a two-axis sensor consists of a pair of sensors mounted orthogonally.

This technology has limitations in regard to resolution owing to the sensitivity of the photocells and the accuracy and alignment of the mask slits. The sensors and the associated electronics are usually separate units. A typical sensor head with an FOV of 128×128 degrees and a resolution of 0.25 degree has a volume of 130 $cm^3$ and a mass of 260 g whereas the associated electronics has a volume of 315 $cm^3$ and a mass of 295 g. Thus a system for full sky viewing consisting of five sensor heads and one electronics box has a total volume requirement of 965 $cm^3$ and a total mass of 1595 g. The power requirement for the system is about 120 mW. Higher accuracy units require significantly more resources especially for the mass, volume, and power for the processing electronics unit.

Thus it would be advantageous to prove a sun sensor that has a smaller volume and a smaller mass.

SUMMARY OF THE INVENTION

The present invention provides an implementation of a sun sensor that provides high resolution over a wide FOR. The sensor uses the principles of a classic pinhole camera in conjunction with a modem two-dimensional detector array. The sensor uses multiple pinholes located in a dome-like housing over the detector array to provide multiple FOV's that project onto a common array. The FOV's are positioned such that when taken in combination comprise the required wide FOR. The overlay of multiple sky images provided by the multiple pinholes onto the common detector allows for the monitoring of the entire FOR since the sun is a unique target within a background that is generally undifferentiated. Thus the sensor takes advantage of this "overlay principle" to multiplex the many FOV's required to retain a high resolution and a wide FOR simultaneously.

A position or sun sensor comprises a sensor housing, a plurality of pinholes formed in the sensor housing, a detector mounted within the housing and a method of processing the information detected. The detector is mounted in the sensor housing. Each pinhole has a field of view and the detector receives the images from each field of view. Each field of view is defined by the position of the pinhole relative to the detector. The images are received in an overlay relationship thereby providing a field of regard. The processing method determines the presence and location of an object in a field of regard.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 2 is a schematic drawing of the FOV's and FOR:

DETAILED DESCRIPTION OF THE INVENTION

Pinholes

Figure 1:
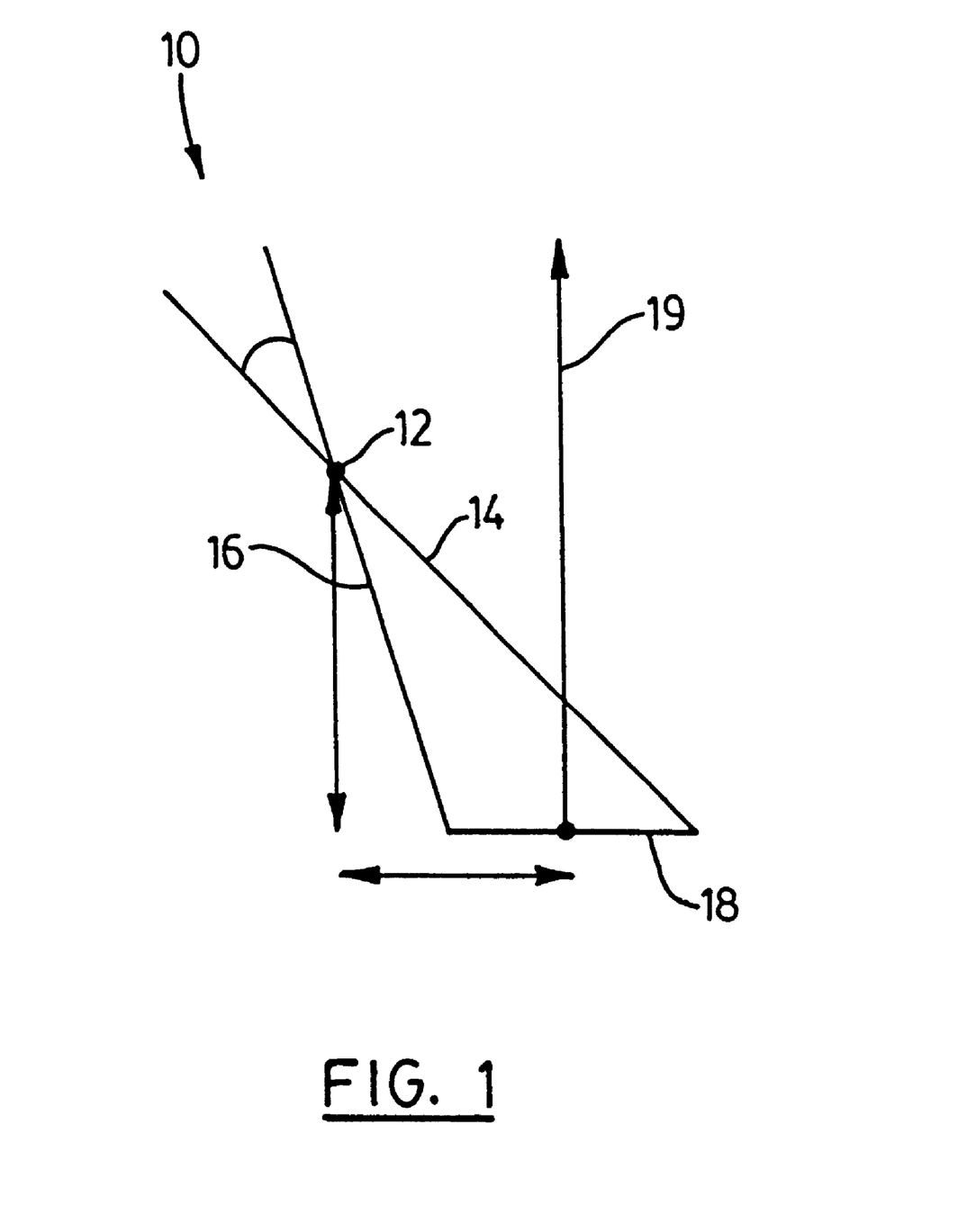
FIG. 1 is a schematic drawing of the pinhole position geometry used in the sun sensors of the present invention.

The classic pinhole camera is the most fundamental of optical instruments. The idealised pinhole camera consists of an extremely small pinhole located above a film or detector plane. It entails no reflective or refractive optics and the image is a true representation of the object, although inverted. Thus the geometric relationship between the detector array and the pinhole(s) defines the extent and resolution of the FOV. FIG. 1 illustrates the pinhole principle shown generally at 10. The actual pinholes must be of a finite size which is limited by considerations that will be discussed later, The locations of the pinholes in the design are determined from the FOV requirements and the detector size. The location of each pinhole 12 is defined by the intersection of the extreme rays 14 and 16 defining the required FOV drawn from the corners of the detector array. Given the symmetry of the FOV's, the pinholes are located in patterns around the boresight axis (19). In operation the FOV is then physically defined by the pinhole positions and the detector size.

Using a series of pinholes located using the method described above, with respect to a common focal plane array 18, the required FOR is divided into smaller FOV's corresponding to each pinhole. Thus the required 120×120 degree field becomes the FOR and the pinholes provide the individual FOV's.

Figure 2:
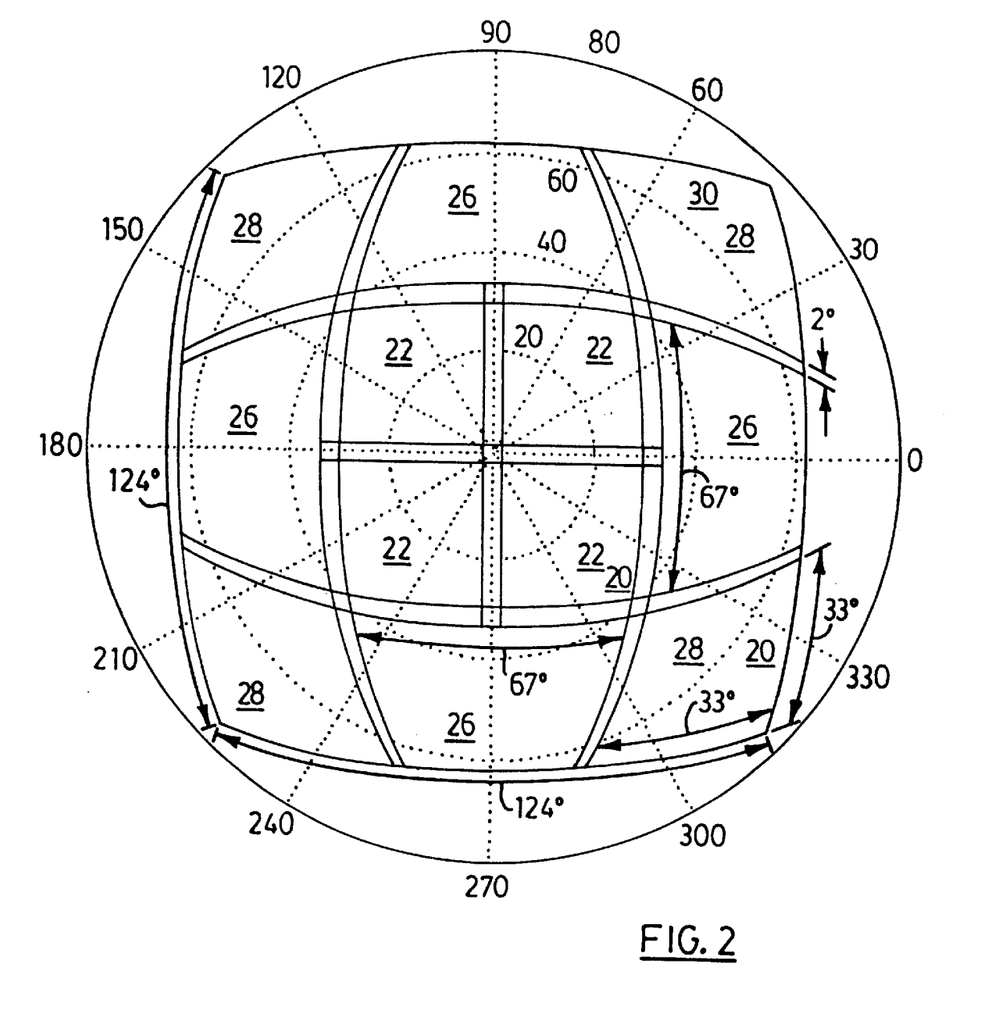

FIG. 2 shows how a 124×124 degree FOR 30 can be divided into twelve FOV's 20. The twelve FOV's are plotted as functions of azimuthal angle and zenith angle on a polar plot. The pinholes for the four inner-FOV's 22 representing the central FOR are located such that central rays from the detector array make an angle of about 24 degrees with the sensor boresight (which is normal to the array). The outer group of four side-FOV's 26 that extend beyond the central region have their pinholes located on rays that are about 51 degrees off the boresight. These are somewhat rectangular owing to the projection of the square detector array via the side pinholes. The four corner-FOV's 28 making up the corners of the full FOR have pinholes positioned so that the central rays are about 60 degrees from the boresight.

As stated above the idealised pinhole camera has an infinitely small pinhole. There are two reasons why the pinhole cannot be made too small. Firstly the pinhole size helps determine the signal level generated by the detector array pixels. Since the irradiance on the detector plane is proportional to the pinhole area, the pinhole must be at least large enough to meet the minimum signal to noise requirements. Secondly the size of the pinhole is limited by diffraction effects. The smaller the pinhole is, the larger the diffraction effects are. Some diffraction is unavoidable and acceptable, but large diffractive effects would be required to be well understood and controlled. Diffractive effects in their simplest form would limit the resolution of the image.

However, increasing the pinhole size also limits the resolution of the image since the pinhole has a geometric extent with an effect that can be thought of as a blur spot. The effective energy distribution on the focal plane is therefore a convolution of the sun's image, the geometric projection of the pinhole, and the intensity distribution resulting from diffraction.

To assess the size of these various contributions it is best to consider a specific example. For a typical detector of 1 cm square, the sensor dimensions are such that the sun's image is only about 100 $\mu$m in diameter. For a 100 $\mu$m diameter pinhole, the blurring corresponds to 100 $\mu$m microns and the central lobe of the Airy diffraction pattern is also on the order of 100 $\mu$m for visible light. Therefore each of these effects would be of equal importance. Increasing the pinhole size would decrease the diffractive effects but increase the size of the pinhole's geometric projection. The opposite is true if the pinhole size is reduced. However, because it is only the centroid of the image that is important and not a resolved image of the sun, the relative contribution each effect has is not critical. Therefore there is some latitude in choosing the pinhole size and the size of the convolved image on the detector can be optimised.

Overlay Principle

Figure 3:
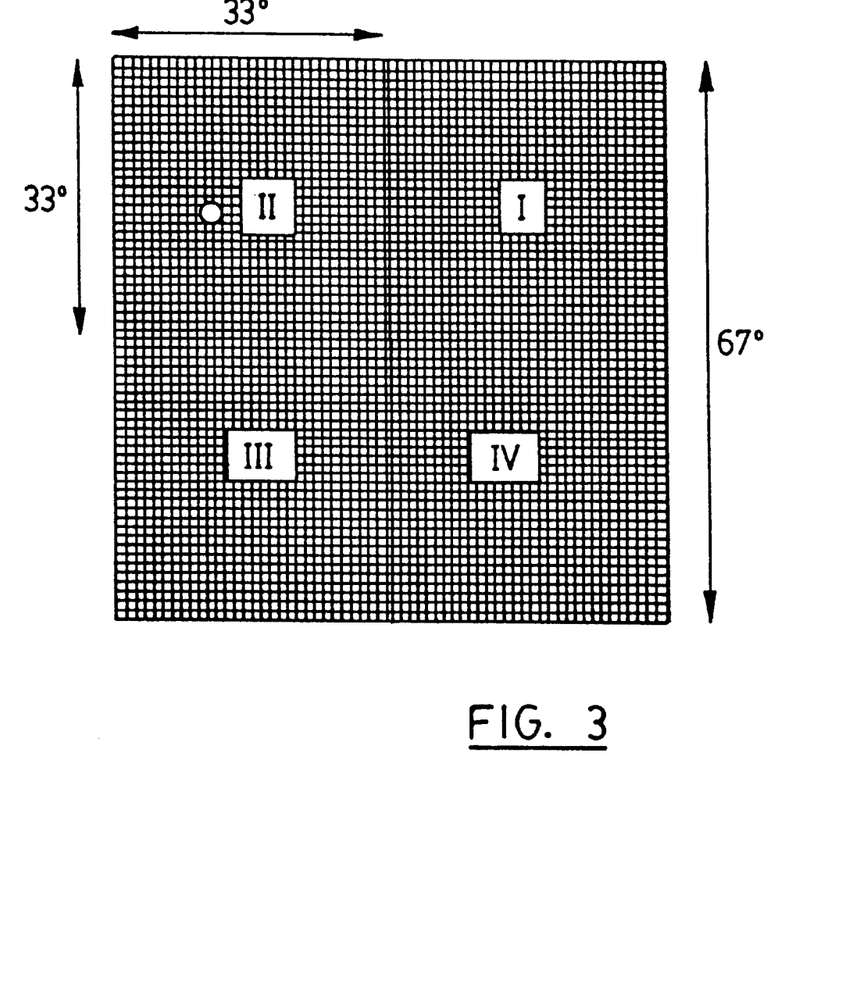
FIG. 3 is a schematic drawing of four adjacent FOV's.
Figure 4:
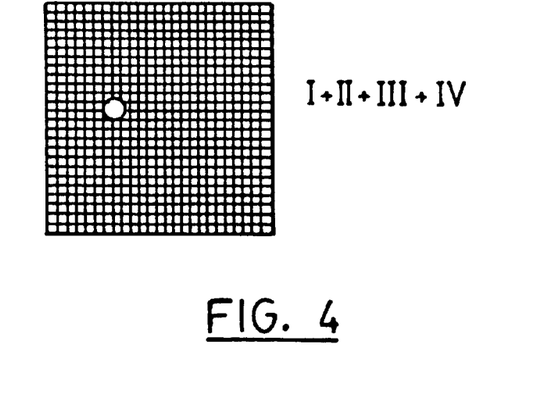
FIG. 4 is a schematic drawing of the four FOV's of FIG. 3 imaged into a common detector array.
Figure 5:
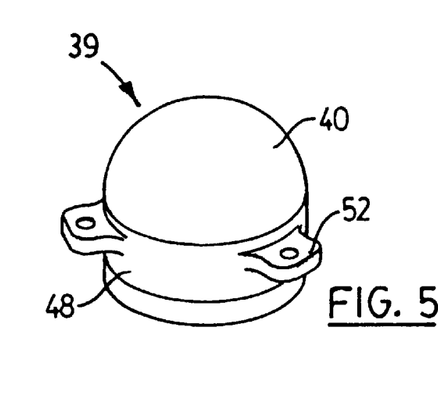
FIG. 5 is a perspective view of the sun sensor constructed in accordance with the present invention.

The function of the sun sensor is to determine the location of the sun within a specified coordinate system with sufficient accuracy and at a required update rate. Given that the sun is a unique object in the sky and that the background features can be readily ignored or easily discriminated, the sun sensor requirements represent an ideal application of the "overlay principle". This technique involves the superimposition of several fields-of-view onto a single detector array as illustrated in FIGS. 3 and 4 where FIG. 3 depicts four separate fields-of-view that are combined in FIG. 4 on the common detector array. This principle may be used where unique targets exist within a generally undifferentiated or readily characterisable background. In general, this approach can lead to instruments that offer high resolution while providing a large field-of-regard. This capability is usually considered inconsistent but the "overlay principle" provides a limited solution to this general problem.

The sensor concept provides for twelve FOV's 20 to cover a 124×124 degree FOR 30 with the inner 22 and corner 28 FOV's corresponding to about 33×33 degrees in locally centred coordinates and the side 26 FOV's corresponding to about 67×33 degrees in locally centred coordinates. Each FOV includes a 2-degree overlap region around its periphery so that transitions from one FOV to the next can be continuously tracked.

There is an inherent degeneracy in the position coordinates of the sun in this technique, that is, the absolute location of the sun is not known without knowing which field-of-view provided the image with the sun in it. There are several means for resolving this degeneracy relying on either pinhole shape, multiple pinholes, or a history of satellite position.

The locations of the pinholes in the design are determined from the FOV requirements and the detector size. The location of each pinhole 12 is defined by the intersection of the extreme rays 14 and 16 defining the required (FOV) drawn from the corners of the detector array. Given the symmetry of the FOV's, the pinholes are located in patterns around the boresight axis (19). In operation the FOV is then physically defined by the pinhole positions and the detector size. The following table lists the positions calculated for a 1 cm by 1 cm detector and a 120 degree by 120 degree FOR. The radial distance and the angles phi and theta are respectively the standard radial, elevation and azimuthal spherical coordinates. The coordinates are referred to the centre of the detector with theta=0 corresponding to one of the detector axes.

| Pinhole Number | Radial distance [mm] | Phi [degees] | Theta [degrees] |
| --- | --- | --- | --- |
| 1 | 12 | 39 | 0 |
| 2 | 12 | 39 | 90 |
| 3 | 12 | 39 | 180 |
| 4 | 12 | 39 | 270 |
| 5 | 15 | 30 | 45 |
| 6 | 15 | 30 | 135 |
| 7 | 15 | 30 | 225 |
| 8 | 15 | 30 | 315 |
| 9 | 16 | 66 | 45 |
| 10 | 16 | 66 | 135 |
| 11 | 16 | 66 | 225 |
| 12 | 16 | 66 | 315 |

Detector and Electronics

The detector array and its integrated processing electronics of the present sun sensor represent a departure from the prior art. Preferably the detector is fabricated in a CMOS process as an active pixel sensor. Preferably the sensing element is silicon and the circuitry for reading out each pixel is fabricated in the same process within each pixel cell. These detectors operate in the visible spectrum although there is no reason why detectors sensitive to other wavelengths cannot be used with this sensor design, Typically an active pixel sensor includes double correlated sampling, analog-to-digital conversion, row/column selections, and random access. The detector operation is much different from the traditional charge-coupled-device (CCD) as charge is not shifted over the array but read out directly.

Since the detector is fabricated in CMOS, other processing elements can be added on the same chip thus providing the required integration of detector and processing. However, in order to minimize development risk, cost, and schedule, the microprocessor and associated memory elements may be incorporated with the detector as part of a multi-chip module (MCM). This arrangement may provide all of the required processing although the architecture and the distribution of processing between the detector chip and the microcontroller is a matter for optimization. The processing may include detecting the sun presence in a particular region of the array, reading out the pixels in the vicinity, performing the necessary centroiding and weighting operations to determine the sun position, and converting the pixel coordinates to a sensor-based coordinate system. Finally, the MCM microcontroller may interface with the satellite computer to pass on the sun position information at the required update rate. Many modem satellites have excess processing capacity within their on-board control computers. Thus, it may be effective to allocate the processing of the sun sensor to the central computer and have the sensor produce raw or semi-processed data periodically or on request.

Although a typical sun location update rate required by a satellite is 10 Hz, with on chip processing the detector may be read out at higher rates such as 100 Hz. This would enable the possibility of two modes of operation. A normal mode would use central computing for optimal accuracy while a second emergency mode with on chip processing could achieve higher readout rates at the expense of accuracy. The emergency mode could be employed, if for example the satellite were spinning out of control.

Packaging

Referring to FIGS. 5–9 the sun sensor is shown generally at 39. The sensor concept lends itself to a very compact design with most of the volume contained in the pinhole dome. Preferably sun sensor 39 includes a dome 40 consisting of a hollow hemispherical piece of glass with an inner surface 42 a predetermined distance to the centre of the detector surface. This distance defines the distance from the closest pinholes to the detector surface. For a detector which is 1 cm on each side, the radius of the sphere's inner surface is slightly less than 12 mm. The radius of the sphere's outer surface is slightly larger than 16 mm. Therefore the minimum thickness of the dome wall has been calculated for this example to be 5 mm. The pinholes are located in bore holes 44 that extend outwardly from the inner surface 42 of the dome 40 but do not extend through to the outer surface 46 thereof. It will be appreciated by those skilled in the art that the position of the pinhole in the thickness of the dome will vary depending on the desired field of view as described above. Accordingly, the depth of each bore hole 44 will be adjusted to position the pinhole at the desired depth. Preferably each pinhole is photo-etched or lithographically deposited onto the glass so that no physical pinholes would be required. Preferably the outside surface 46 of the dome 40 is coated so as to attenuate the solar input, provide thermal reflection, and protect against electrostatic buildup. A thin gold coating is ideal for an application in space. The gold will reflect most of the thermal radiation and the thickness of the gold can be selected to be such that the correct irradiance passes through the pinhole and onto the detector. Preferably the glass dome is mounted onto an aluminum base 48. Similarly the inner surface between the boreholes is coated so that light does not pass through the dome between the boreholes.

Figure 14:
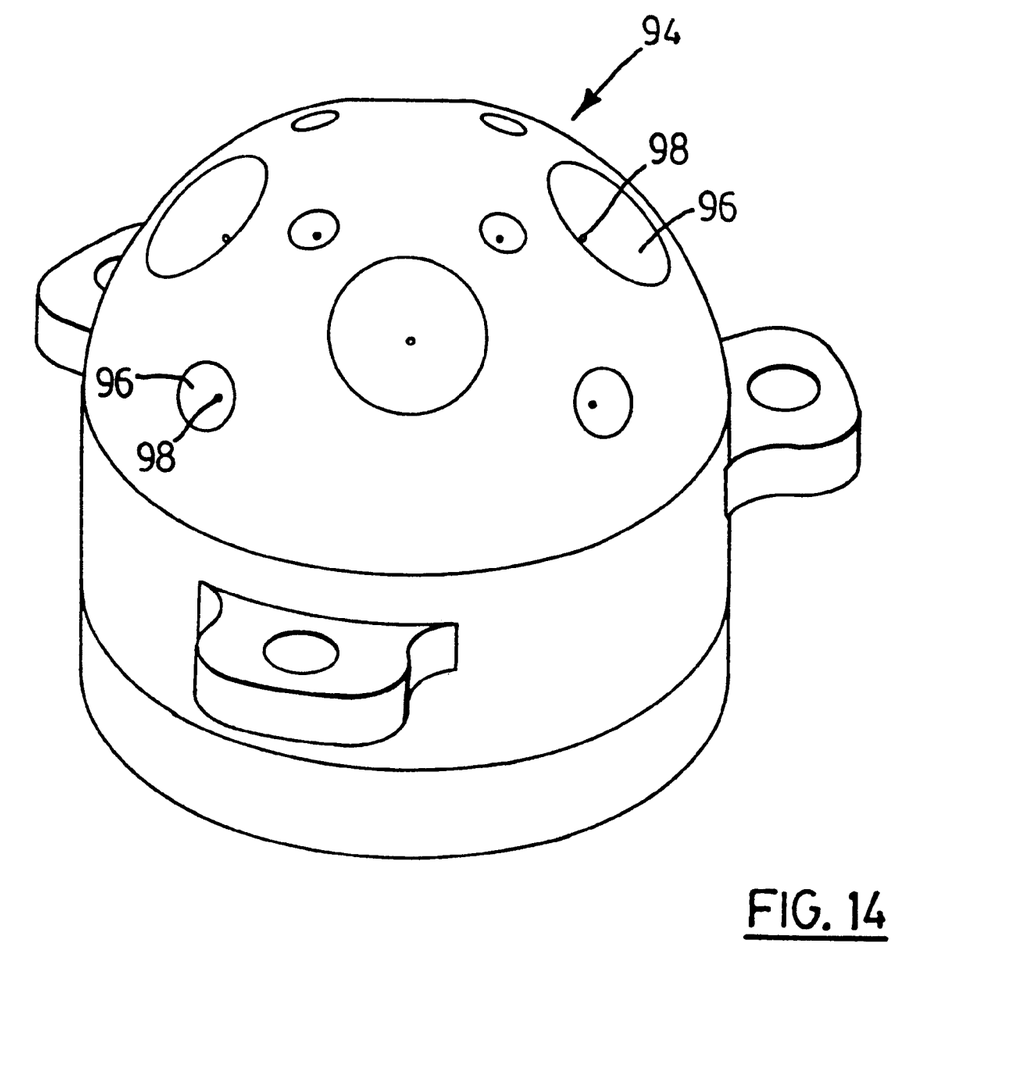
FIG. 14 is a perspective view of an alternate embodiment of the sun sensor constructed in accordance with the present invention.

Alternatively, the dome may be made from a metal or plastic substrate with pinholes inserted into the appropriately machine recesses. For solar applications typically aluminium or titanium would be used because of their weight and thermal characteristics. Whereas for ground based systems plastic or other metals may be used. FIG. 14 shows generally at 94 a housing made from an opaque solid. The depths of the recesses 96 are such that the pinholes 98 are located the calculated distance from the detector as described earlier. The angle of the conical recess is selected to match the FOV for that particular pinhole. Therefore the shape and the slope of the recess is dependent on the position of the pinhole in the dome. Boreholes as described above or formed in the inner surface of the dome in registration with the pinholes as described above. The pinholes themselves may be conventional, mechanical pinholes manufactured from a thin metal foil or they may be photoetched or lithographically deposited onto a transparent substrate that are positioned in the pinholes to fill them. The latter option would allow for the pinhole to simultaneously act as a filter to attenuate the solar throughput.

The pinholes may be made in various non-circular shapes to eliminate degeneracies; for example an L- or T-shaped pinhole may be used in various orientations. Relying on shaped pinholes requires that they be rather large so as to dominate the image shape when convolved with the other effects. In the example above the size of the pinhole would have to be larger then 100 $\mu$m. Similarly, the shape of the pinhole may be used for substantially smaller pinholes but then it may be the diffraction pattern not the actual pinhole shape that would distinguish the pinholes.

Figures 10, 11:
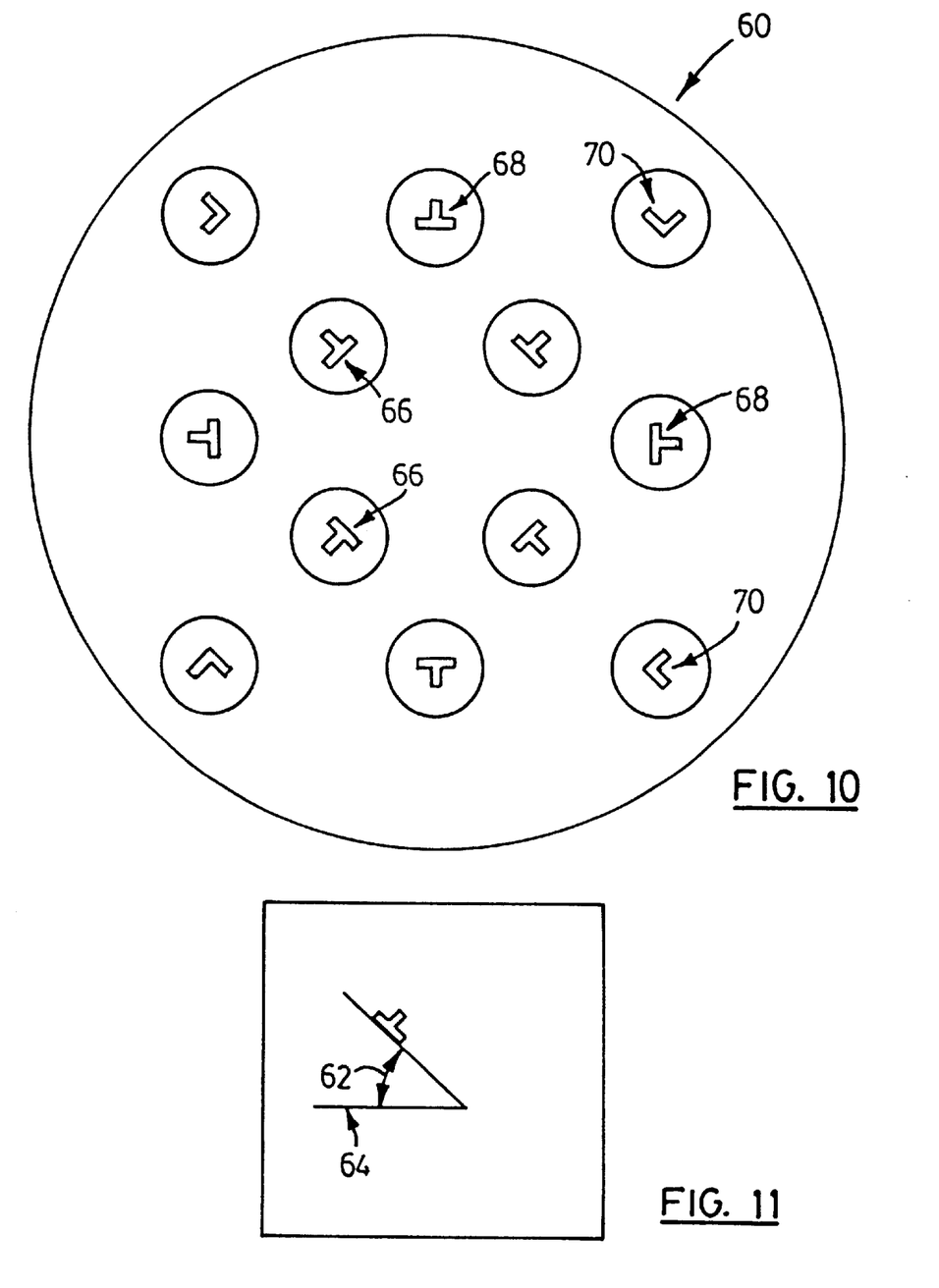
FIG. 10 a top view of an alternate embodiment of the dome of the sun sensor showing uniquely shaped pinholes.
FIG. 11 is a schematic drawing of a uniquely shaped pinhole relative to the detector axes.

FIGS. 10 and 11 illustrate an example of a sun sensor shown generally at 60 using pinholes having predetermined shapes and unique orientations. The shapes shown herein are T's and L's. The shapes and orientations of the pinholes are such that each pinhole has a non-degenerate image. The sizes of the pinholes shown herein are greatly exaggerated for clarity of presentation. Firstly the shape of the resultant spot on the detector is determined by a simple algorithm. An example of a simple algorithm is one that determines the centroid of the image to differentiate the T's from the L's. Symmetry requires that the centroid of a tee must lie within the image of the tee itself. Whereas, in the case of an L the aspect ratio of arm length to slit width can easily be chosen such that the centroid does not lie within the image. Hence the T's and L's can be distinguished by a simple algorithm that checks whether or not the centroid lies within the image. The angle 62 the shape makes with the detector axes 64 then identifies which T or L is forming the image. In the example shown herein the centre pinholes 66 are T shapes, the side pinholes 68 are T shapes and the corner pinholes 70 are L shapes.

It is also possible to use two pinholes located in close proximity to each other so as to operate as a paired set of pinholes. If the pinholes are mounted such that the line connecting the pinholes is perpendicular to a line normal to the detector surface, then the distance separating the two pinhole images is preserved regardless of sun angle. Having pairs of pinholes with varied separations can therefore resolve any degeneracies. Note that this technique requires the overlap of the FOV's to be large enough to completely contain the largest pinhole pair.

Figure 12:
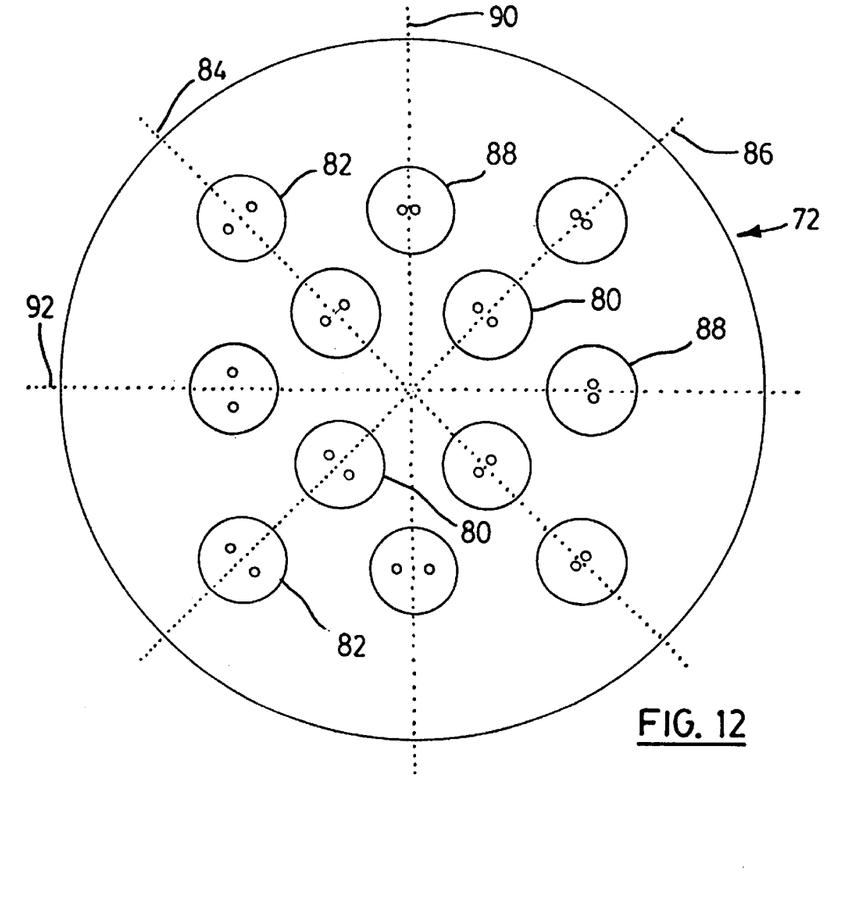
FIG. 12 is a top view of another alternate embodiment of the dome of the sun sensor showing pairs of pin holes.
Figure 13:
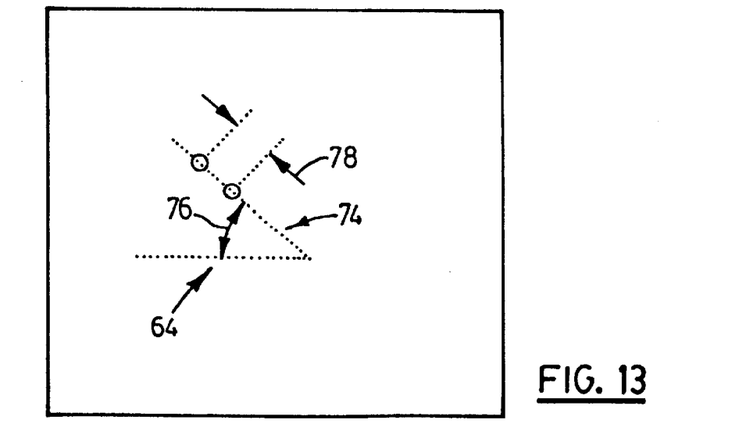
FIG. 13 is a schematic drawing of a uniquely shaped pinhole relative to the detector axes.

FIGS. 12 and 13 illustrate another example of a sun sensor shown generally at 72 showing the use of two pinholes to non-ambiguously identify which pin holes formed the image. As above, the size and spacing of the pin hole pairs has been greatly exaggerated to improve the clarity of presentation. The centroids of the two pin holes define a line 74. The angle 76 the line makes with the detector axes 64 identifies to which of four symmetry axes the pin holes belong. The length of the line 78 corresponds to the spacing of the pin holes and uniquely identifies which pin hole on the symmetry axis is casting the image. The central pinholes 80 and the corner pinholes 82 are arranged along a first 84 and second 86 orthogonal axes. Each pinhole along each of the first and second axes has a unique predetermined spacings Similarly the side pinholes 88 are arranged along a side first 90 and second 92 orthogonal axes and each pinhole along each side first and second axes has a unique predetermined spacing.

Finally, the history of the satellite position can also determine which pinhole is illuminated. Since there exist non-degenerate cases where the images lie in the regions of FOV overlap, these positions can be used to initiate a tracking of satellite position. From these non-degenerate positions the evolution of the satellite position can be determined so long as the changes in satellite orientation from one measurement to the next is sufficiently small. Thus this technique may not be useful for a satellite spinning rapidly as it might during emergency manoeuvers or when out of control.

Thermal sensitivity could potentially limit the ultimate accuracy of the sensor. Efforts taken to minimise the sensor's temperature variability, such as a low emissivity coating on the outside of the dome and pinholes, could only reduce but not eliminate thermal changes. These thermal effects could be reduced by selecting materials for manufacture such that the relative positions of the pinholes with respect to the detector would change only minimally. Further improvements could be had by actively stabilising the sensor temperature or by calibrating the effects of thermal changes.

Figure 6:
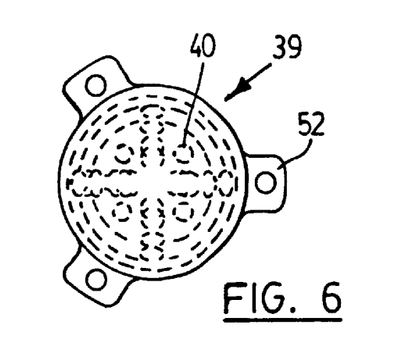
FIG. 6 is a top view of the sun sensor of FIG. 5.
Figure 7:
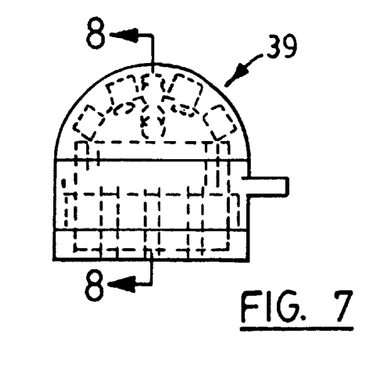
FIG. 7 is a side view of the sun sensor of FIG. 5.
Figure 8:
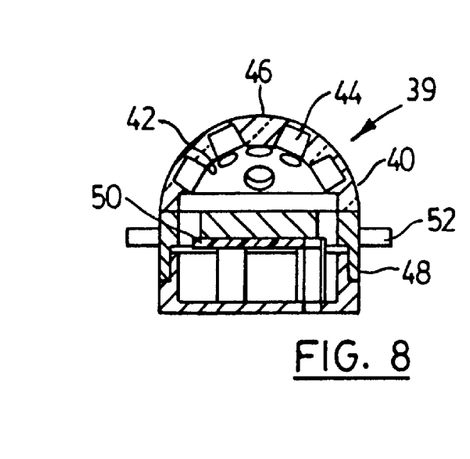
FIG. 8 is a section view of the sun sensor taken along 8—8 of FIG. 7.
Figure 9:
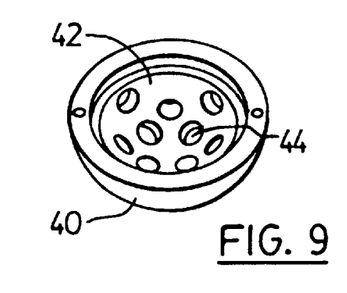
FIG. 9 is a perspective view of the dome portion of sun sensor of the present invention as viewed from the inside.

Referring to FIGS. 6 and 8 the MCM is mounted to the base of the sensor under the dome on a printed circuit board 50 and any additional electronics for power conditioning and/or satellite telemetry interface are mounted in the region around the chip or on the other side of the PCB. It is expected that the sensor would be mounted to a satellite with three bolts via a flange or tabs 52 arranged around the periphery of the unit. The satellite interface connector providing power and data interfaces may be mounted beneath the sensor with a cutout in the satellite panel to accommodate the interconnection cable. A bonding lug may be provided in the base of the sensor so that the unit may be strapped as required to the satellite structure. Several areas around the periphery of the sensor base may be machined flat and polished so that they may be used as sensor alignment reference surfaces It will be appreciated that the above description relates to the invention by way of example only. Many variations on the invention will be obvious to those skilled in the art and such obvious variations are within the scope of the invention as described herein whether or not expressly described.

What is claimed as the invention is:

1. A position sensor comprising:
    a sensor housing;
    a plurality of pinholes formed in the sensor housing, each pinhole having a field of view;
    a two dimensional array detector mounted in the sensor housing for receiving superimposition images of the plurality of fields of view in overlay relationship thereby providing a field of regard and wherein each field of view is defined by the position of the pinhole relative to the detector and each pinhole is positioned at predetermined radial, elevation and azimuthal spherical coordinates; and
    processing means connected to the detector for determining the presence and location of an object in the field of regard.

2. A position sensor as claimed in claim 1 wherein the processing means has a normal mode using central computing and an emergency mode using on chip processing.

3. A position sensor as claimed in claim 1 wherein the sensor housing has a dome portion and the plurality of pinholes are formed in the dome portion and the pinholes are positioned such that each pinhole has a field of view that is generally distinct and generally exclusive.

4. A position sensor as claimed in claim 3 wherein each pinhole is a pair of pinholes having a predetermined spacing therebetween.

5. A position sensor as claimed in claim 4 wherein the pair of pinholes are positioned such that each field of view from a pair of pinholes overlaps the field of view from an adjacent pair of pinholes.

6. A position sensor as claimed in claim 5 wherein each pair of pinholes has a central ray and there are twelve pairs of pinholes, four central pairs of pinholes, four corner pairs of pinholes and four side pairs of pinholes; wherein the detector is a planar array having a boresight normal to the centre thereof; wherein the four central pairs of pinholes are positioned such that an angle between each central my and the boresight is generally 24°, the four corner pairs of pinholes are positioned such that an angle between each central ray and the boresight is generally 60° and the four side pairs of pinholes are positioned such that an angle between each central ray and the boresight is generally 51°.

7. A position sensor as claimed in claim 6 wherein each overlap is 2°.

8. A position sensor as claimed in claim 7 wherein the central pairs of pinholes and the side pairs of pinholes are arranged along a first and second orthogonal axes and each pair of pinholes along each of the first and second axes has a unique predetermined spacing.

9. A position sensor as claimed in claim 8 wherein the side pair of pinholes are arranged along a side first and second orthogonal axes and each pair of pinhole along each of the side first and second axes has a unique predetermined spacing.

10. A position sensor as claimed in claim 1 wherein the sensor housing has a dome portion and the plurality of pinholes are formed in the dome portion.

11. A position sensor as claimed in claim 10 wherein the pinholes are positioned such that each field of view from a pinhole overlaps the field of view from an adjacent pinhole.

12. A position sensor as claimed in claim 11 wherein the object is the sun and wherein the processing means determines the shape of the image and thereafter which field of view corresponds to a particular pinhole of the plurality of pinholes.

13. A position sensor as claimed in claim 11 wherein the object is the sun and wherein the processing means determines the size of the image and thereafter which field of view corresponds to a particular pinhole of the plurality of pinholes.

14. A position sensor as claimed in claim 11 wherein the dome is constructed of glass having a hemispheric inside surface and a hemispheric outside surface and each pinhole has a bore hole in registration therewith and formed in the dome and each bore having an inner surface that has the corresponding pinhole photoetched thereon.

15. A position sensor as claimed in claim 14 wherein each pinhole does not penetrate the outer surface.

16. A position sensor as claimed in claim 15 wherein the inner surface of the dome is coated with an opaque coating.

17. A position sensor as claimed in claim 15 wherein the outer surface has a coating coated thereon thereby providing a material to attenuate the solar input, provide thermal reflection, and protect against electrostatic buildup.

18. A position sensor as claimed in claim 17 wherein the coating is gold.

19. A position sensor as claimed in claim 11 wherein the dome is constructed of an opaque material chosen from the group consisting of metal and plastic, the dome having a hemispheric inside surface and a hemispheric outside surface and each pinhole extends from the inside surface through the outside surface.

20. A position sensor as claimed in claim 19 wherein each pinhole has an outer recess and an inner borehole in registration therewith formed in the dome each dimensioned so as to provide a clear field of view associated with the pinhole.

21. A position sensor as claimed in claim 20 wherein the outer surface has a coating coated thereon thereby providing a material to attenuate the solar input, provide thermal reflection, and protect against electrostatic buildup.

22. A position sensor as claimed in claim 21 wherein the coating is gold.

23. A position sensor as claimed in claim 20 wherein each pinhole has glass positioned therein thereby providing a filter substrate.

24. A position sensor as claimed in claim 23 wherein the glass in each pinhole is photoetched.

25. A position sensor as claimed in claim 23 wherein the glass in each pinhole has a pinhole deposited thereon lithographically.

26. A position sensor as claimed in claim 11 wherein each pinhole has a central ray and there are twelve pinholes, four central pinholes, four corner pinholes and four side pinholes; wherein the detector is a planar array having a boresight normal to the centre thereof; wherein the four central pinholes are positioned such that an angle between each central ray and the boresight is generally 24°, the four corner pinholes are positioned such that an angle between each central ray and the boresight is generally 60° and the four side pinholes are positioned such that an angle between each central ray and the boresight is generally 51°.

27. A position sensor as claimed in claim 26 wherein each overlap is 2°.

28. A position sensor as claimed in claim 27 wherein each pinhole is a pair of pinholes having a predetermined spacing therebetween.

29. A position sensor as claimed in claim 28 wherein the central pinholes and the side pinholes are arranged along a first and second orthogonal axes and each pinhole along each of the first and second axes has a unique predetermined spacing.

30. A position sensor as claimed in claim 29 wherein the side pinholes are arranged along a side first and second orthogonal axes and each pinhole along each of the side first and second axes has a unique predetermined spacing.

31. A position sensor as claimed in claim 27 wherein each pinhole has a predetermined shape.

32. A position sensor as claimed in claim 31 wherein each of the central pinholes has the same predetermined shape and each central pinhole has a unique orientation.

33. A position sensor as claimed in claim 32 wherein each of the corner pinholes has the same predetermined shape and each corner pinhole has a unique orientation.

34. A position sensor as claimed in claim 33 wherein each of the side pinholes has the same predetermined shape and each side pinhole has a unique orientation.

35. A position sensor as claimed in claim 34 wherein the centre pinholes and the side pinholes have the same shape.

* * * * *